United States Patent
Persson et al.

(10) Patent No.: US 9,025,460 B2
(45) Date of Patent: *May 5, 2015

(54) METHOD AND TRANSMITTING UNIT FOR REDUCING A RISK OF TRANSMISSION STALLING

(71) Applicant: Telefonaktiebolaget L M Ericsson (publ), Stockholm (SE)

(72) Inventors: Håkan Persson, Solna (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 14 days.

This patent is subject to a terminal disclaimer.

(21) Appl. No.: 13/921,898

(22) Filed: Jun. 19, 2013

(65) Prior Publication Data

US 2013/0279396 A1  Oct. 24, 2013

Related U.S. Application Data

(63) Continuation of application No. 12/812,106, filed as application No. PCT/EP2008/051552 on Dec. 22, 2008, now Pat. No. 8,493,861.

(60) Provisional application No. 61/109,910, filed on Jan. 9, 2008.

(51) Int. Cl.
  H04L 12/26 (2006.01)
  H04L 12/861 (2013.01)
  H04L 1/16 (2006.01)
  H04L 1/18 (2006.01)
  H04L 12/801 (2013.01)

(52) U.S. Cl.
  CPC ............... *H04L 49/90* (2013.01); *H04L 1/1858* (2013.01); *H04L 47/10* (2013.01); *H04L 1/1664* (2013.01); *H04L 1/187* (2013.01)

(58) Field of Classification Search
  None
  See application file for complete search history.

(56) References Cited

U.S. PATENT DOCUMENTS

| 5,625,872 A | 4/1997 | Sawyer |
| 6,653,619 B2 | 11/2003 | Chin et al. |

(Continued)

FOREIGN PATENT DOCUMENTS

| EP | 1333609 A1 | 8/2003 |
| EP | 1123601 B1 | 6/2006 |
| RU | 2150177 C1 | 5/2000 |

(Continued)

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol", Sep. 2007, 3GPP TS 44.060 V7.10.0 Release 7.*

*Primary Examiner* — Khoa Huynh
(74) *Attorney, Agent, or Firm* — Coats & Bennett, PLLC (57) ABSTRACT

According to a method for reducing a risk of transmission stalling between a transmitting unit and a receiving unit, data blocks are transmitted to the receiving unit from the transmitting unit. Each data block includes a block sequence number (BSN). The transmitted data blocks are stored in a transmission buffer. A flow of retransmission of transmitted data blocks is controlled with a transmission buffer window comprising an acknowledge state variable (ASV) that contains the BSN value of the oldest data block that has not been positively acknowledged by its peer. If a BSN corresponding to the ASV is acknowledged in a first type of acknowledgment message, a status of the BSN is set as tentative acknowledged. If the block sequence number is acknowledged in a second type of acknowledgement message, the status of the BSN is set as acknowledged, and the transmission buffer window is advanced to the ASV.

16 Claims, 3 Drawing Sheets

(56) References Cited

U.S. PATENT DOCUMENTS 8,214,709 B2 7/2012 Umesh et al.
2006/0067238 A1* 3/2006 Olsson et al. ............... 370/242

FOREIGN PATENT DOCUMENTS

| WO | 2006118418 A2 | 11/2006 |
|----|---------------|---------|
| WO | 2007074845 A1 | 7/2007  |

* cited by examiner

METHOD AND TRANSMITTING UNIT FOR REDUCING A RISK OF TRANSMISSION STALLING

RELATED APPLICATIONS

This application is a continuation of U.S. application Ser. No. 12/812,106, filed 8 Jul. 2010, which was the National Stage of International Application No. PCT/SE2008/051552, filed 22 Dec. 2008, which claims the benefit of U.S. Application No. 61/019,910 filed 9 Jan. 2008, the disclosures of each of which are incorporated herein by reference in their entirety.

TECHNICAL FIELD

The present disclosure relates to a method and a transmitting unit in a communication network system and, more particularly to a transmitting unit allowing for reducing a risk of transmission stalling as well as a method for such reduction.

BACKGROUND

Data communication protocols designed to provide a reliable data transfer typically make use of error control protocols. The error control protocols are designed to detect errors in the received data blocks and to signal the status of the received data blocks back to the transmitter from the receiver over a feedback channel indicating if the received data block was correctly or erroneously received. This allows the transmitter to retransmit erroneous data blocks.

If a data block has not been received correctly the block is said to be Negative ACKnowledged (NACK) while a correctly received data block is ACKnowledged (ACK). Each data block is typically associated with a sufficiently enough unique sequence number to keep track of the individual block. A data block is retransmitted if the receiver indicates sequence number in the error control protocol over the feedback channel as being not received correctly, i.e., a NACK is sent. One example of an ACK/NACK protocol is the TCP protocol, see e.g. "Transmission Control Protocol," J. Postel, RFC-793, September 1981; in the TCP/IP suite of protocols.

In General Packet Radio Service (GPRS) GPRS/EDGE the ACK/NACK indication of a data block or a number of data blocks is signaled in a control block message, see "Radio Link Control/Medium Access Control (RLC/MAC) protocol," 3GPP TS 44.060 Rel-7. The network (NW) side controls the whole procedure in both uplink and downlink directions. The user equipment (UE) is polled when a Packet Downlink ACK/NACK message is to be sent to the network when the NW is the transmitting side and the UE is the receiving side of the data stream. If the data stream is sent in the uplink direction, i.e., when the UE is the transmitter and the NW the receiver, the NW transmits the ACK/NACK indications in a Packet Uplink ACK/NACK message to the UE.

In Global System for Mobile Communication/Enhanced Data rates for GSM Evolution (GSM/EDGE) Radio Access Network (GERAN)GERAN Evolution a Fast ACK/NACK reporting (FANR) scheme has been introduced, in addition to the existing control messages, by which ACK/NACK indications may also be piggybacked onto an RLC data block by using a Piggybacked Ack/Nack (PAN) field, see "Radio Link Control/Medium Access Control (RLC/MAC) protocol," 3GPP TS 44.060 Rel-7. The reason is to provide a faster Ack/Nack mechanism. The Ack/Nack reports have typically a starting sequence number followed by a bitmap containing a sequence of Ack/Nack indicators of the data blocks in ascending order. This approach optimizes the message length. The starting sequence number can be omitted if the start of the bitmap is known by other means. The reliable transfer mode in GERAN is the RLC Acknowledged Mode.

ACK/NACK messages are typically protected by a checksum that is used to verify that the ACK/NACK content has not been altered during the transmission. An example of a checksum is a Cyclic Redundancy Check (CRC) error detecting code. In GERAN both the Packet Uplink/Downlink ACK/NACK message and PAN field are protected by a CRC.

However, when FANR is applied, the limited amount of bits available for a CRC-based PAN-field error detection results in a higher probability for indicating that a PAN has been received correctly when the PAN actually contains errors. This may cause severe problems like stalling the RLC protocol without being able to recover from this state eventually ending the data connection. The PUAN/PDAN (Packet uplink Ack/Nack/Packet downlink Ack/Nack) messages have a CRC that is more reliable since it has a CRC protection with lower probability of so called false ACK/NACKs and the risk for a stall without recovery is low.

If a PAN has been received and the block sequence number (BSN) equal to V(A) is set to ACK, the transmit window will advance one step. However, if this was falsely done then the receiver still expects that the previous V(A) will be retransmitted while the transmitter considers it already to be correctly received and has erased it. Hence it is not possible to recover that data block. As a result, the transmitter will send a new data block.

V(A) is an acknowledge state variable—the acknowledge state variable contains the BSN value of the oldest RLC data block that has not been positively acknowledged by its peer. V(A) is updated after each reception of the RBB (Received block bitmap) from the peer RLC.

The reception of a block with a sequence number greater than the highest sequence number in the receive window indicates that the transmit window of the peer (transmitting) device has advanced further than the receive window of the receiving device; indicates that the transmitter had incorrectly advanced its window, based on a false positive PAN.

At this stage, i.e., when the receiver detects that a block with a sequence number greater than the highest sequence number in the receive window is received; it could indicate the fact that an unexpected data block has been received to the transmitter by sending a EPGRS PACKET DOWNLINK ACK/NACK. However this would not solve the problem since the transmitter has already advanced its window and the block that would be a subject for another retransmission is removed from the buffer and is hence no longer available for retransmission.

Hence there exists a need for a transmission protocol that improves over existing transmission protocol and to reduce the risk of stalling transmission.

Another problem that may occur in existing transmission protocols is if an outstanding data block other than the oldest outstanding data block is indicated as correct but this is false for the same reason as described above.

SUMMARY

Accordingly, one or more embodiments of the present disclosure provide an improved method and transmitting unit for reducing a risk of transmission stalling between the transmitting unit and a receiving unit in a communication network system comprising said transmitting unit arranged to transmit data blocks to said receiving unit. Each data block comprises a block sequence number and transmitted data blocks are stored in a transmission buffer. A transmission buffer window is arranged to control the flow of retransmission of said transmitted data blocks.

According to a first aspect of embodiments of the present disclosure, a risk of transmission stalling is reduced by a method which performs the step of when said block sequence number has been acknowledged in a first type of acknowledgement message (e.g., piggybacked acknowledgement/negative acknowledgement field) setting a status of said block sequence number as tentative acknowledged, and setting a status of said block sequence number as acknowledged upon receipt of a second type of acknowledgement message (e.g., packet uplink acknowledgement/negative acknowledgement message or a packet downlink acknowledgement/negative acknowledgement message) comprising an acknowledgement for said block sequence number.

According to a second aspect of embodiments of the present disclosure, a transmitting unit is operative to reduce a risk of transmission stalling between the transmitting unit and a receiving unit in a communication network system. The transmitting unit includes one or more circuits configured to: transmit data blocks to the receiving unit from the transmitting unit, wherein each data block comprises a block sequence number; and store the transmitted data blocks in a transmission buffer. The one or more processing circuits are further configured to control flow of retransmission of the transmitted data blocks by using a transmission buffer window comprising an acknowledge state variable that contains the block sequence number value of the oldest data block that has not been positively acknowledged by its peer. Responsive to a block sequence number corresponding to the acknowledge state variable being acknowledged in a first type of acknowledgement message, a status of the block sequence number is set as tentative acknowledged. Responsive to the block sequence number being acknowledged in a second type of acknowledgement message, the status of the block sequence number is set as acknowledged, and the transmission buffer window is advanced to the acknowledge state variable. The acknowledged status has a different meaning from the tentative acknowledged status.

Further embodiments are listed in the dependent claims.

Thanks to the provision of a method and a transmitting unit, which are letting the lowest end of the transmission buffer window to advance only when the block sequence number is set as ACK in the received second type of acknowledgement message (e.g., PUAN/PDAN message), e.g., after the corresponding block sequence number has been received as ACK in the first type of acknowledgement message (e.g., PAN field), the risk of stalling due to an erased data block in the transmission buffer can be eliminated.

Still other objects and features of embodiments of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
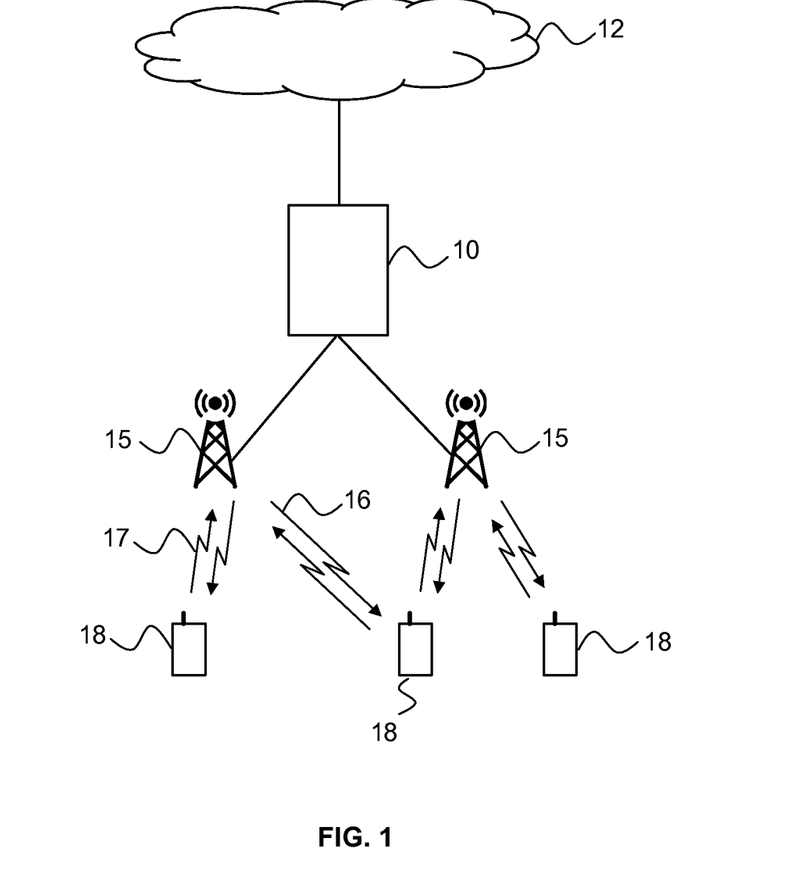
FIG. 1 shows a communication network architecture according to embodiments of the present disclosure.

FIG. 1 depicts a communication system including a Radio Access Network (RAN), such as the GSM Edge Radio Access Network (GERAN) architecture, comprising at least one Base Transceiver Station (BTS) 15 (two are shown in FIG. 1) connected to a controller unit, such as a radio network controller node (RNC) or Base Station Controller (BSC) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits data blocks to each user equipment 18. On the uplink channel 17, the user equipments 18 transmit data blocks to the BTS 15. Preferably, the data blocks are sent using a radio link control (RLC) protocol. Each transmitted RLC data block is assigned a block sequence number (BSN). The BSN takes its value from a range [0; SNS-1] called the sequence number space (SNS).

According to a preferred embodiment of the present disclosure, the communication system is herein described as a GSM communication system. The skilled person, however, realizes that the inventive method and arrangement works very well on other packet based communications systems as well. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

As stated above in the background section, a cyclic redundancy check (CRC) based PAN-field error detection results in a higher probability for indicating that a PAN has been received correctly when the PAN actually contains errors. This may cause severe problems like stalling the RLC protocol without being able to recover from this state eventually ending the data connection.

Normally, the reason for a protocol being stalled, assuming that a window size (WS) is adequately set, is that the oldest outstanding block has difficulties to be received correctly. Such difficulties may for example be because of difficult radio conditions. Also, the protocol is stalled if no new data can be transmitted, meaning that window size data blocks have been sent where the lowest data block sent is equal to V(A) and the highest data block that has been sent is equal to V(A)+WS−1.

As explained above, V(A) is the acknowledge state variable the acknowledge state variable contains the BSN value of the oldest RLC data block that has not been positively acknowledged by its peer. V(A) shall be set to the value 0 at the beginning of each transport block format (TBF) in which the RLC endpoint is the transmitter. V(A) is updated after each reception of the RBB (Received block bitmap) from the peer RLC.

At the time of transmission each transmitted Radio Link Control (RLC) data block is assigned a BSN equal to V(S). V(S) is a send state variable, which denotes the sequence number of the next in-sequence RLC data block to be transmitted. V(S) is incremented by 1 (modulo SNS) after transmission of the RLC data block with BSN=V(S).

V(B) is an array of Sequence Number Space (SNS) elements indicating the acknowledgement status of Window Size (WS) previous RLC data blocks. When an element in V(B) falls outside of the active transmit window, i.e., [V(A)≤BSN<V(S)] modulo SNS, the element shall be set to the value INVALID.

Further, V(Q) denotes the lowest BSN not yet received (modulo SNS), which therefore represents the start of the receive window. V(R) is a receive state variable, which denotes the BSN which has a value one higher than the highest BSN yet received (modulo SNS). V(N) is a receive state array, which is an array of SNS elements indicating the receive status of the window size RLC data blocks that are to follow the block BSN=V(Q)−1 (modulo SNS). The array is indexed relative to V(Q) modulo SNS.

According to embodiments of the present disclosure, in order to avoid stalling due to false positive PAN reception, the following procedure shall be executed in the transmitter:

First, in case a PAN is received containing an ACK for a data block with sequence number BSN' where BSN'=V(A) then the start of the transmit window will remain as V(A), i.e., the transmit window will not be advanced at this point. In accordance with one embodiment the transmitter may in this case consider the data block as Tentatively Acknowledged (TACK) and therefore not initiate a re-transmission. This will save radio resources.

If and only if a PUAN/PDAN is received where an ACK is received for a sequence number BSN' which is equal to V(A) the start of the active transmit window is allowed to advance. In a preferred embodiment the transmit window is allowed to advance to V(A)=[BSN'+1] modulo SNS.

As already anticipated in existing usage of the GERAN ACK/NACK protocol, the former bullet will be repeated for every subsequent ACK in the same PUAN/PDAN message (until the first NACK is received). That is, V(A) may be advanced even further.

When a PAN has been received, all BSNs set to Acknowledged in the PAN shall be set to Tentatively Acknowledged in V(B). The Tentatively Acknowledged BSNs contained in V(B) will change to the value Acknowledged or NACKED (i.e., not acknowledged) based on the values received in a PUAN/PDAN message. That is, a BSN may also be changed to Not Acknowledged (NACKED) and therefore the data block associated to that BSN is retransmitted. If a PUAN/PDAN message contains an ACK/NACK report with values from the beginning of receive window, i.e., V(Q), then if there are BSNs less than V(Q) in the active transmit window in V(B), i.e., [V(A)≤BSN<V(Q)] modulo SNS, then those BSNs may be considered as Acknowledged. Note that V(Q) as such does not exist in transmitter side but is implicitly known since the ACK/NACK report contains an indication that it reports from start of receive window.

In case of transmission of a down link transport block format the network is in accordance with one embodiment set to schedule enough number of polls based on channel quality and window sizes so that the protocol does not stall because new data cannot be sent while waiting for an ACK to advance the transmission window. In accordance with one embodiment at least one poll for every window size is transmitted.

According to another embodiment, the start of the window can be allowed to advance if two PANs have been received with same information of V(A) as ACK. However, in case of high error conditions this may be less robust and the window may only be allowed to advance when the corresponding block sequence number is set as ACK in the received PUAN/PDAN message According to yet another embodiment the transmitter may consider a received PAN with an ACK for a data block as a pending ACK and allow pre-emptive retransmissions. If later a PUAN/PDAN with a beginning window value higher than V(A) is received the data blocks with a BSN lower than V(Q) may be regarded as acknowledged.

Figure 2:
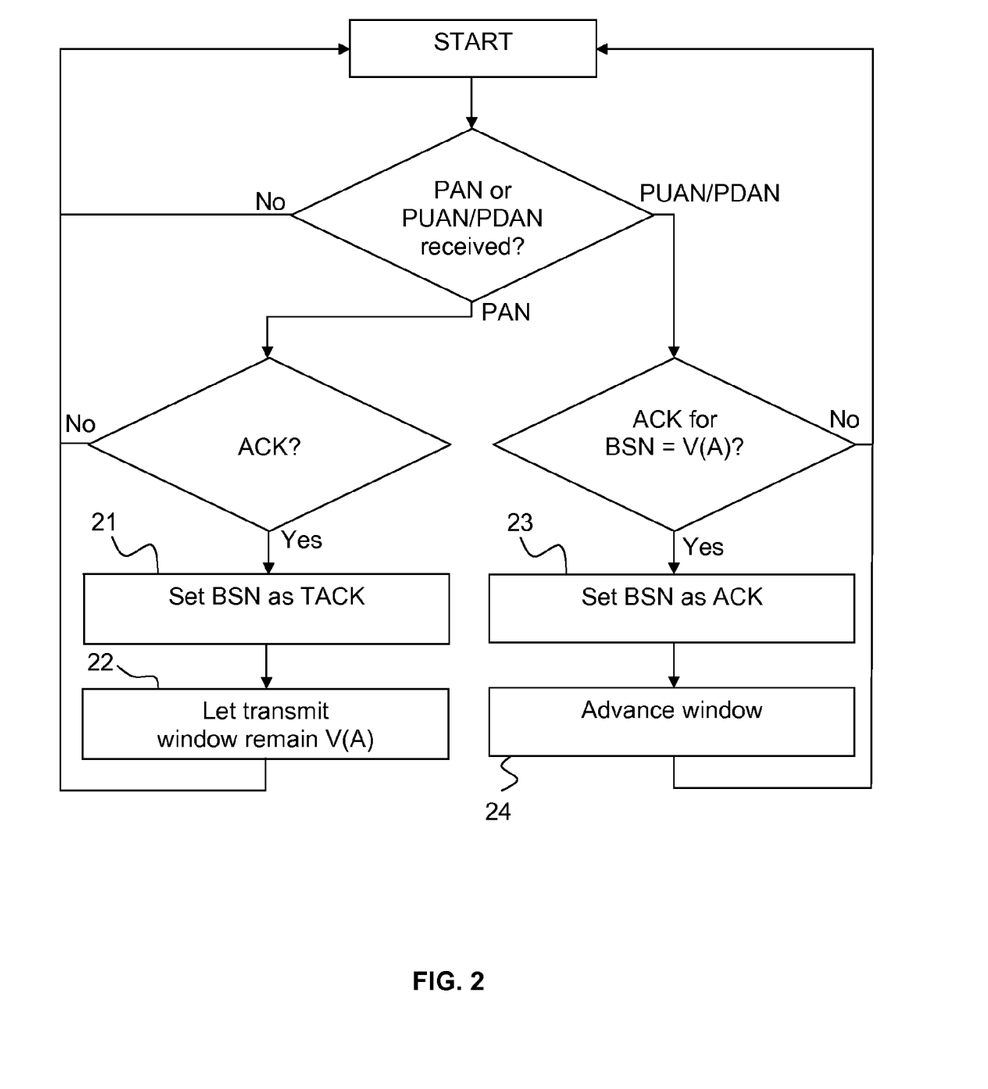
FIG. 2 is a flowchart illustrating the inventive method in a transmitting unit.

According to embodiments of the present disclosure, the procedure in a transmitting unit of avoiding transmission stalling in a communication network system comprising said transmitting unit arranged to transmit data blocks to a receiving unit over a radio interface, wherein each data block comprises a block sequence number, transmitted data blocks are stored in a transmission buffer and a transmission buffer window is arranged to control the flow of retransmission of said transmitted data blocks, as shown in FIG. 2, is as follows:

If a block sequence number equal to an acknowledge state variable, V(A) has been acknowledged in a piggybacked acknowledgement/negative acknowledgement field, letting said transmission buffer window remain V(A) (step 22), i.e., the transmission buffer window is not advanced. Optionally, setting the block sequence number as tentative acknowledged (step 21);

If a packet uplink acknowledgement/negative acknowledgement message or a packet downlink acknowledgement/negative acknowledgement message is received containing an acknowledgement for said block sequence number setting said block sequence number as acknowledged (step 22).

Thus, if an acknowledged block sequence state variable has been acknowledged by a PAN then that block sequence number will be set to acknowledged only if a subsequent PUAN/PDAN has acknowledged said block sequence number.

According to some embodiments, when said block sequence number is set as acknowledged the method further comprises the step of advancing said transmission buffer window (step 23) to an acknowledge state variable, V(A),=[BSN'+1] modulo BNS, wherein BNS' is the block sequence number and SNS is a sequence number space. If the new V(A) also has been acknowledged correctly, i.e., in the PUAN/PDAN message and not only in the PAN field, the V(A) is increased further and the window is advanced further and so on.

According to some embodiments, wherein said receiving unit comprises a receive buffer having a receive buffer window, and:

if said packet uplink acknowledgement/negative acknowledgement message or said packet downlink acknowledgement/negative acknowledgement message contains an acknowledgement/negative acknowledgement for block sequence numbers which are equal to a receive window state variable, V(Q), corresponding to a beginning of said receive buffer window; and, if there are block sequence numbers less than said receive window state variable, V(Q), in said transmission buffer window, the procedure further comprises the step of considering said block sequence numbers less than said receive window state variable, V(Q), as acknowledged.

According to some embodiments, when a radio link control acknowledged mode is used, the procedure comprises the step of updating said acknowledge state variable, V(A), from values received from its peer in a received block bitmap of said packet uplink acknowledgement/negative acknowledgement message or said packet downlink acknowledgement/negative acknowledgement message.

According to some embodiments, when a radio link control non-persistent mode is used for a multimedia broadcast/multicast service bearer, the procedure comprises the step of updating said acknowledge state variable, V(A), from values received from its peers in a received block bitmap of a multimedia broadcast/multicast service downlink acknowledgement/negative acknowledgement message.

According to some embodiments, when a radio link control non-persistent mode is used for an enhanced general packet radio service transport block format, the procedure comprises the step of updating said acknowledge state variable, V(A), from values received from its peers in:
    said packet uplink acknowledgement/negative acknowledgement message;
    an enhanced general packet radio service packet downlink acknowledgement/negative acknowledgement message;
    an enhanced general packet radio service packet downlink acknowledgement/negative acknowledgement type 2 message; or,
    said piggybacked acknowledgement/negative acknowledgement field.

According to some embodiments, the procedure further comprises the steps of:
    setting said acknowledge state variable, V(A), to the block sequence number of the oldest data block in said transmission buffer which meets the condition [V(S)−BSN'] modulo SNS≥WS, wherein V(S) is a send state variable, BSN' is block sequence number, SNS is sequence number space and WS is window size; or,
    setting said acknowledge state variable, V(A), to said send state variable, V(S) if all data blocks have been positively acknowledged by corresponding peer or peers.

According to some embodiments, when a radio link control acknowledged mode is used and a bitmap of a piggybacked acknowledgement/negative acknowledgement field is interpreted, the procedure comprises the step of setting any elements of an array of sequence number space elements, V(B) that would be set to acknowledged to tentative acknowledged.

Figure 3:
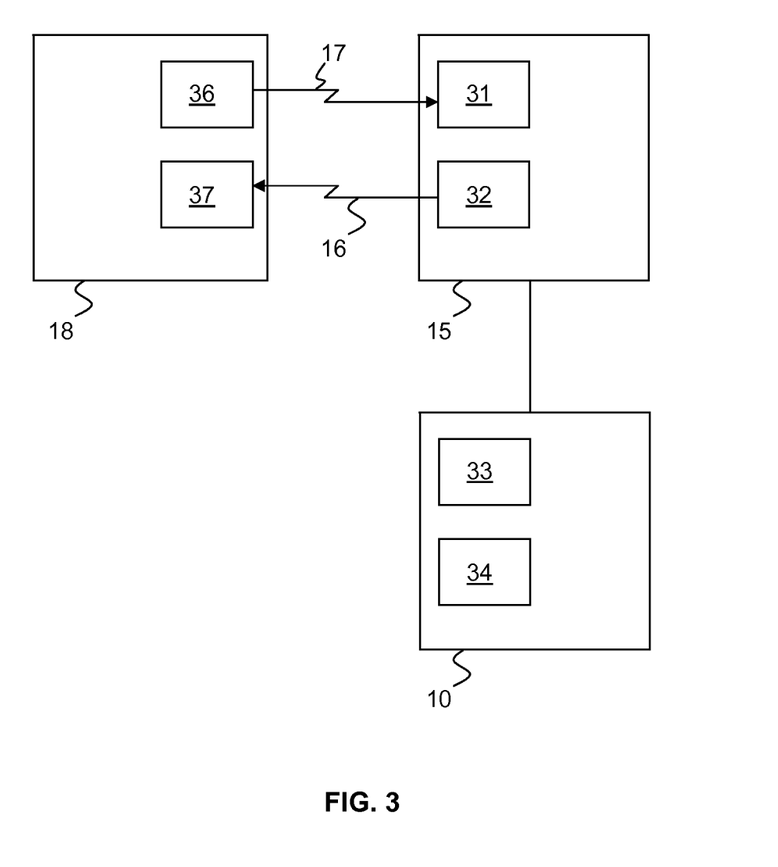
FIG. 3 is a simplified block diagram of an inventive user equipment and communication network nodes.

FIG. 3 is a block diagram showing a user equipment 18 and a communication network node 15, such as a Base Transceiver Station (BTS) and another communication network node 10, such as a Base Station Controller (BSC) for reducing a risk of transmission stalling between a transmitting unit and a receiving unit in a communication network system comprising said transmitting unit arranged to transmit data blocks to said receiving unit, wherein each data block comprises a block sequence number, transmitted data blocks are stored in a transmission buffer and a transmission buffer window is arranged to control the flow of retransmission of said transmitted data blocks.

The BTS 15 (which is a communication network node) comprises a transmitting unit 32 (one or more circuits) including a radio transmitter, the transmission buffer and the transmission buffer window. The BTS 15 further comprises a receiving unit 31 including a receiver, a receiving buffer and a receiving buffer window. The transmitter 32 is transmitting data to a receiver 37 of the user equipment 18 over a radio interface on the downlink channel 16. The receiver 31 is receiving data from the user equipment 18 on the uplink channel 17. The transmitting unit 32 is arranged, when said block sequence number has been acknowledged in a piggybacked acknowledgement/negative acknowledgement field, to set said block sequence number as acknowledged upon receipt of a packet uplink acknowledgement/negative acknowledgement message or a packet downlink acknowledgement/negative acknowledgement message comprising an acknowledgement for said block sequence number.

The BSC 10 (which is a communication network node) comprises a transmitting unit 33 including a transmitter, the transmission buffer and the transmission buffer window. The BSC 10 further comprises a receiving unit 34 including a receiver, a receiving buffer and a receiving buffer window. The transmitter 33 is transmitting data to a receiver 37 of the user equipment 18 via the BTS 15. The receiver 34 is receiving data from the user equipment 18 via the BTS 15. The transmitting unit 33 is arranged, when said block sequence number has been acknowledged in a piggybacked acknowledgement/negative acknowledgement field, to set said block sequence number as acknowledged upon receipt of a packet uplink acknowledgement/negative acknowledgement message or a packet downlink acknowledgement/negative acknowledgement message comprising an acknowledgement for said block sequence number.

The user equipment 18 comprises a transmitting unit 36 including a radio transmitter, the transmission buffer and the transmission buffer window. The radio transmitter is arranged to transmit data packets to the receiver 31 of the RBS 15 over the radio interface on the uplink channel 17 or, to the receiver 34 of the BSC 10 via the BTS 15. The UE 18 further comprises a receiving unit 37 including a receiver, a receiving buffer and a receiving buffer window. The receiver is arranged to receive data packets transmitted from the transmitter 32 of the RBS 15 on the downlink channel 16 or, from the transmitter 33 of the BSC 10 via the BTS 15. The transmitting unit 36 is arranged, when said block sequence number has been acknowledged in a piggybacked acknowledgement/negative acknowledgement field, to set said block sequence number as acknowledged upon receipt of a packet uplink acknowledgement/negative acknowledgement message or a packet downlink acknowledgement/negative acknowledgement message comprising an acknowledgement for said block sequence number.

According to some embodiments, when said block sequence number is set as acknowledged said transmitting unit is further arranged to advance said transmission buffer window to an acknowledge state variable, $V(A),=[BSN'+1]$ modulo SNS, wherein BNS' is the block sequence number and SNS is a sequence number space.

According to some embodiments, the transmitting unit further is arranged to consider said block sequence numbers less than a receive window state variable, V(Q), as acknowledged:
    if said packet uplink acknowledgement/negative acknowledgement message or said packet downlink acknowledgement/negative acknowledgement message contains an acknowledgement/negative acknowledgement for block sequence numbers which are equal to said receive window state variable, V(Q), corresponding to a beginning of said receive buffer window; and,
    if there are block sequence numbers less than said receive window state variable, V(Q), in said transmission buffer window.

According to some embodiments, when a radio link control acknowledged mode is used, the transmitting unit further is arranged to update said acknowledge state variable, V(A), from values received from its peer in a received block bitmap of said packet uplink acknowledgement/negative acknowledgement message or said packet downlink acknowledgement/negative acknowledgement message.

According to some embodiments, when a radio link control non-persistent mode is used for a multimedia broadcast/multicast service bearer, the transmitting unit further is arranged to update said acknowledge state variable, V(A), from values received from its peers in a received block bitmap of a multimedia broadcast/multicast service downlink acknowledgement/negative acknowledgement message.

According to some embodiments, when a radio link control non-persistent mode is used for an enhanced general packet radio service transport block format, the transmitting unit further is arranged to update said acknowledge state variable, V(A), from values received from its peers in:
- said packet uplink acknowledgement/negative acknowledgement message;
- an enhanced general packet radio service packet downlink acknowledgement/negative acknowledgement message;
- an enhanced general packet radio service packet downlink acknowledgement/negative acknowledgement type 2 message; or,
- said piggybacked acknowledgement/negative acknowledgement field.

According to some embodiments, the transmitting unit further is arranged to:
- set said acknowledge state variable, V(A), to the block sequence number of the oldest data block in said transmission buffer which meets the condition [V(S)−BSN'] modulo SNS≥WS, wherein V(S) is a send state variable, BSN' is block sequence number, SNS is sequence number space and WS is window size; or,
- set said acknowledge state variable, V(A), to said send state variable, V(S) if all data blocks have been positively acknowledged by corresponding peer or peers.

According to some embodiments, when a radio link control acknowledged mode is used and a bitmap of a piggybacked acknowledgement/negative acknowledgement field is interpreted, the transmitting unit further is arranged to set any elements of an array of sequence number space elements, V(B) that would be set to acknowledged to tentative acknowledged.

According to some embodiments, parts of the solution may be described as:

In RLC acknowledged mode, each RLC endpoint transmitter shall have an associated acknowledge state array (V(B)). V(B) is an array of SNS elements indicating the acknowledgement status of WS previous RLC data blocks. The array is indexed relative to the acknowledge state variable V(A) modulo SNS. The values of V(B) shall be updated from the values received from its peer in the reported bitmap (RB) of the Packet Ack/Nack message. If a compressed reported bitmap is received, decompression shall be first applied.

The transmitter shall transmit the oldest RLC data block whose corresponding element in V(B) indexed relative to V(A) has the value NACKED. As each RLC data block is transmitted the corresponding element in V(B) is set to the value PENDING_ACK. If the RLC data block to be transmitted is split over two radio blocks, both radio blocks shall be transmitted. On initial transmission the RLC data blocks are sent with one of the initial code rates (the rate ⅓ encoded data is punctured with Puncturing Scheme (PS) 1 of the selected Modulation and Coding Scheme MCS) and if the RLC data block is required to be retransmitted it is sent with PS 2 of the selected MCS. On subsequent retransmissions the RLC data block is transmitted with PS in a cyclic process.

If [V(S)<V(A)+WS] modulo SNS and no RLC data blocks have a corresponding element in V(B) with the value NACKED, the RLC data block with BSN=V(S) shall be transmitted and the corresponding element in V(B) shall be set to the value PENDING_ACK. If the transmitter is the mobile station, the pre-emptive transmission bit is set to '1' in the PACKET UPLINK ACK/NACK message and there are no further RLC data blocks available for transmission (i.e., the RLC data block with BSN=V(S) does not exist), the sending side shall transmit the oldest RLC data block whose corresponding element in V(B) has the value PENDING_ACK, then the next oldest block whose corresponding element in V(B) has the value PENDING_ACK, etc.

If in this case there are no RLC data blocks whose corresponding element in V(B) has the value PENDING_ACK and either the uplink TBF is not operated in extended uplink TBF mode or the uplink TBF is operated in extended uplink TBF mode but the mobile station shall not refrain from sending an RLC/MAC block (i.e., EXT_UTBF_NODATA is set to '0'), the sending side shall transmit the oldest RLC data block whose corresponding element in V(B) has the value TENTATIVE_ACK and set the corresponding value in V(B) to PENDING_ACK, then the next oldest block whose corresponding element in V(B) has the value TENTATIVE_ACK and set the corresponding value in V(B) to PENDING_ACK, etc. If all RLC data blocks whose corresponding element in V(B) has the value PENDING_ACK have been transmitted once, the process shall be repeated beginning with the oldest RLC data block.

If [V(S)=V(A)+WS] modulo SNS (i.e., the transmit window is stalled), the sending side shall transmit the oldest RLC data block whose corresponding element in V(B) has the value PENDING_ACK, then the next oldest RLC data block whose corresponding element in V(B) has the value PENDING_ACK, etc. If in this case there are no RLC data blocks whose corresponding element in V(B) has the value PENDING_ACK and either the uplink TBF is not operated in extended uplink TBF mode or the uplink TBF is operated in extended uplink TBF mode but the mobile station shall not refrain from sending an RLC/MAC block (i.e., EXT_UTBF_NODATA is set to '0'), the sending side shall transmit the oldest RLC data block whose corresponding element in V(B) has the value TENTATIVE_ACK and set the corresponding value in V(B) to PENDING_ACK, then the next oldest block whose corresponding element in V(B) has the value TENTATIVE_ACK and set the corresponding value in V(B) to PENDING_ACK, etc. If all RLC data blocks whose corresponding element in V(B) has the value PENDING_ACK has been transmitted once, the process shall be repeated beginning with the oldest RLC data block. This process of transmitting the oldest RLC data blocks whose value in V(B) has the value PENDING_ACK shall continue as long as equation [V(S)=V(A)+WS] modulo SNS holds. If the transmitter is the mobile station and the pre-emptive transmission bit is set to '0' in the PACKET UPLINK ACK/NACK message the transmitter shall not transmit the oldest RLC data block whose corresponding element in V(B) has the value PENDING_ACK or TENTATIVE_ACK (and the next continuing indefinitely).

When a PACKET UPLINK ACK/NACK message or a PAN field is received the mobile station shall retransmit the RLC blocks which are set to NACKED in V(B) and new RLC data blocks as far as the transmit window (if advanced) allows. However if the RLC data block is the last in the TBF it shall be retransmitted even if its state is PENDING_ACK or TENTATIVE_ACK. The default for the mobile side is that the transmitter shall use pre-emptive transmission. If the transmitter is on the network side this process (pre-emptive transmission) of transmitting the oldest RLC data blocks whose value in V(B) has the value PENDING_ACK or TENTATIVE_ACK is optional.

NOTE: If the Mobile Station only has RLC data blocks whose value in V(B) has the value PENDING_ACK or TENTATIVE_ACK and the pre-emptive transmission bit is set to '0', PACKET UPLINK DUMMY CONTROL BLOCK messages are sent.

When an element in V(B) falls outside of the active transmit window, i.e., [V(A)≤BSN<V(S)] modulo SNS, the element shall be set to the value INVALID.

In the extended uplink TBF mode, if V(S)=V(A) and there is no RLC data block with BSN=V(S) available, the mobile station shall stop sending RLC data blocks. The mobile station shall continue sending RLC data blocks when a RLC data block with BSN=V(S) is available.

According to some embodiments, parts of the solution may be described as:

The value of V(A) shall be updated from the values received from its peer in the received block bitmap (RBB) of the PACKET UPLINK ACK/NACK, EGPRS PACKET DOWNLINK ACK/NACK or EGPRS PACKET DOWNLINK ACK/NACK TYPE 2 message.

In the case of a PAN field, the bitmap shall be interpreted in the same way as for the case of PACKET UPLINK ACK/NACK, EGPRS PACKET DOWNLINK ACK/NACK or EGPRS PACKET DOWNLINK ACK/NACK TYPE 2 message with the following exceptions:

In RLC acknowledged mode, elements of V(B) shall not be set to ACKED; any element which would be set to ACKED shall be set to TENTATIVE_ACK;

if the processing of a PAN would cause an element of V(B) to be changed from ACKED or TENTATIVE_ACK to NACKED, the entire PAN field shall be ignored;

if a PAN positively acknowledges a block which has not yet been transmitted (i.e., whose BSN is higher than or equal to V(S)) the entire PAN field shall be ignored;

if a time-based PAN indicates a reserved value the entire PAN field shall be ignored.

NOTE: The last three conditions may arise due to undetected error in the PANI or in the PAN field.

Using the method and transmitting unit as described herein reduces the risk for stalling a transmission and existing message solutions can be used. The method and transmitting unit will provide for faster reaction time since receiver does not need to wait for a message indicating the problem. Also there is no forced release due to a previously received erroneous PAN since transmit window has not been advanced because of a PAN has been received.

Thus, while there have been shown and described and pointed out fundamental novel features of the disclosure as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present disclosure are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

What is claimed is:

1. A method for reducing a risk of transmission stalling between a transmitting unit and a receiving unit in a communication network system, wherein the method comprises:

transmitting data blocks to the receiving unit from the transmitting unit, wherein each data block comprises a block sequence number;

storing the transmitted data blocks in a transmission buffer;

controlling flow of retransmission of the transmitted data blocks by using a transmission buffer window comprising an acknowledge state variable that contains the block sequence number value of the oldest data block that has not been positively acknowledged by its peer;

responsive to a block sequence number corresponding to the acknowledge state variable being acknowledged in a first type of acknowledgement message, setting a status of the block sequence number as tentative acknowledged;

responsive to the block sequence number being acknowledged in a second type of acknowledgement message:
setting the status of the block sequence number as acknowledged; and
advancing the transmission buffer window to the acknowledge state variable;

wherein the acknowledged status has a different meaning from the tentative acknowledged status;

wherein a block sequence number status set as acknowledged has a different value than a block sequence number status set as tentative acknowledged; and wherein the first type of message is different from the second type of message.

2. The method of claim 1, wherein the receiving unit comprises a receive buffer having a receive buffer window, the method further comprising, considering the block sequence numbers less than a receive window state variable corresponding to a beginning of the receive buffer window as acknowledged when both:

the second type of acknowledgement message comprises an acknowledgement/negative acknowledgement for block sequence numbers which are equal to the receive window state variable; and there are block sequence numbers less than the receive window state variable in the transmission buffer window.

3. The method of claim 1, wherein when a radio link control acknowledged mode is used, the method further comprises updating the acknowledge state variable from values received from its peer in a received block bitmap of the second type of acknowledgement message.

4. The method of claim 1, wherein when a radio link control non-persistent mode is used for a multimedia broadcast/multicast service bearer, the method further comprises updating the acknowledge state variable from values received from its peers in a received block bitmap of a multimedia broadcast/multicast service downlink acknowledgement/negative acknowledgement message.

5. The method of claim 1, wherein when a radio link control non-persistent mode is used for an Enhanced General Packet Radio Service (EGPRS) transport block format, the method further comprises updating the acknowledge state variable from values received from its peers in the first type of acknowledgement message or the second type of acknowledgement message.

6. The method of claim 1, wherein the method further comprises:
  setting the acknowledge state variable to the block sequence number of the oldest data block in the transmission buffer which meets the condition [V(S)−BSN'] modulo SNS≤WS, wherein V(S) is a send state variable which denotes a block sequence number of a next in a sequence data block to be transmitted, BSN' is a block sequence number, SNS is sequence number space, and WS is a window size; or
  setting the acknowledge state variable to the send state variable if all data blocks have been positively acknowledged by corresponding peer or peers.

7. The method of claim 1, wherein when a radio link control acknowledged mode is used and a bitmap of the first type of acknowledgement message is interpreted, the method further comprises setting any elements of an array of sequence number space elements that would be set to acknowledged to tentative acknowledged.

8. A transmitting unit operative to reduce a risk of transmission stalling between the transmitting unit and a receiving unit in a communication network system, the transmitting unit comprising:
  one or more circuits configured to:
    transmit data blocks to the receiving unit from the transmitting unit, wherein each data block comprises a block sequence number;
    store the transmitted data blocks in a transmission buffer;
    control flow of retransmission of the transmitted data blocks by using a transmission buffer window comprising an acknowledge state variable that contains the block sequence number value of the oldest data block that has not been positively acknowledged by its peer;
    responsive to a block sequence number corresponding to the acknowledge state variable being acknowledged in a first type of acknowledgement message, set a status of the block sequence number as tentative acknowledged;
    responsive to the block sequence number being acknowledged in a second type of acknowledgement message:
      set the status of the block sequence number as acknowledged; and
      advance the transmission buffer window to the acknowledge state variable;
    wherein the acknowledged status has a different meaning from the tentative acknowledged status;
    wherein a block sequence number status set as acknowledged has a different value than a block sequence number status set as tentative acknowledged; and
    wherein the first type of message is different from the second type of message.

9. The transmitting unit of claim 8, wherein the receiving unit comprises a receive buffer having a receive buffer window, and the one or more circuits are further configured to consider block sequence numbers less than a receive window state variable corresponding to a beginning of the receive buffer window as acknowledged when both:
  the second type of acknowledgement message comprises an acknowledgement/negative acknowledgement for block sequence numbers which are equal to the receive window state variable; and
  there are block sequence numbers less than the receive window state variable in the transmission buffer window.

10. The transmitting unit of claim 8, wherein when a radio link control acknowledged mode is used, the one or more circuits are further configured to update the acknowledge state variable from values received from its peer in a received block bitmap of the second type of acknowledgement message.

11. The transmitting unit of claim 8, wherein when a radio link control non-persistent mode is used for a multimedia broadcast/multicast service bearer, the one or more circuits are further configured to update the acknowledge state variable from values received from its peers in a received block bitmap of a multimedia broadcast/multicast service downlink acknowledgement/negative acknowledgement message.

12. The transmitting unit of claim 8, wherein when a radio link control non-persistent mode is used for an Enhanced General Packet Radio Service (EGPRS) transport block format, the one or more circuits are further configured to update the acknowledge state variable from values received from its peers in the first type of acknowledgement message or the second type of acknowledgement message.

13. The transmitting unit of claim 8, wherein the one or more circuits are further configured to:
  set the acknowledge state variable to the block sequence number of the oldest data block in the transmission buffer which meets the condition [V(S)−BSN'] modulo SNS≤WS, wherein V(S) is a send state variable which denotes a block sequence number of a next in a sequence data block to be transmitted, BSN' is a block sequence number, SNS is sequence number space, and WS is a window size; or
  set the acknowledge state variable to the send state variable if all data blocks have been positively acknowledged by corresponding peer or peers.

14. The transmitting unit of claim 8, wherein when a radio link control acknowledged mode is used and a bitmap of the first type of acknowledgement message is interpreted, the one or more circuits are further configured to set any elements of an array of sequence number space elements that would be set to acknowledged to tentative acknowledged.

15. The transmitting unit of claim 8, wherein the transmitting unit is configured in a user equipment (UE) for use in the communication network system.

16. The transmitting unit of claim 8, wherein the transmitting unit is configured in a communication network node for use in the communication network system.

* * * * *

UNITED STATES PATENT AND TRADEMARK OFFICE
CERTIFICATE OF CORRECTION

PATENT NO. : 9,025,460 B2
APPLICATION NO. : 13/921898
DATED : May 5, 2015
INVENTOR(S) : Persson et al.

It is certified that error appears in the above-identified patent and that said Letters Patent is hereby corrected as shown below:

Title page, item (63), under "Related U.S. Application Data", in Column 1, Line 2, delete "PCT/EP2008/051552" and insert -- PCT/SE2008/051552 --, therefor.

Title page, item (60), under "Related U.S. Application Data", in Column 1, Line 1, delete "No. 61/109,910," and insert -- 61/019,910, --, therefor.

Specification

In Column 7, Line 32, delete "SNS$\geq$WS," and insert -- SNS $\leq$ WS, --, therefor.

In Column 9, Line 28, delete "SNS$\geq$WS," and insert -- SNS $\leq$ WS, --, therefor.

Signed and Sealed this
Sixteenth Day of August, 2016

Michelle K. Lee
*Director of the United States Patent and Trademark Office*